Patented Oct. 9, 1928.

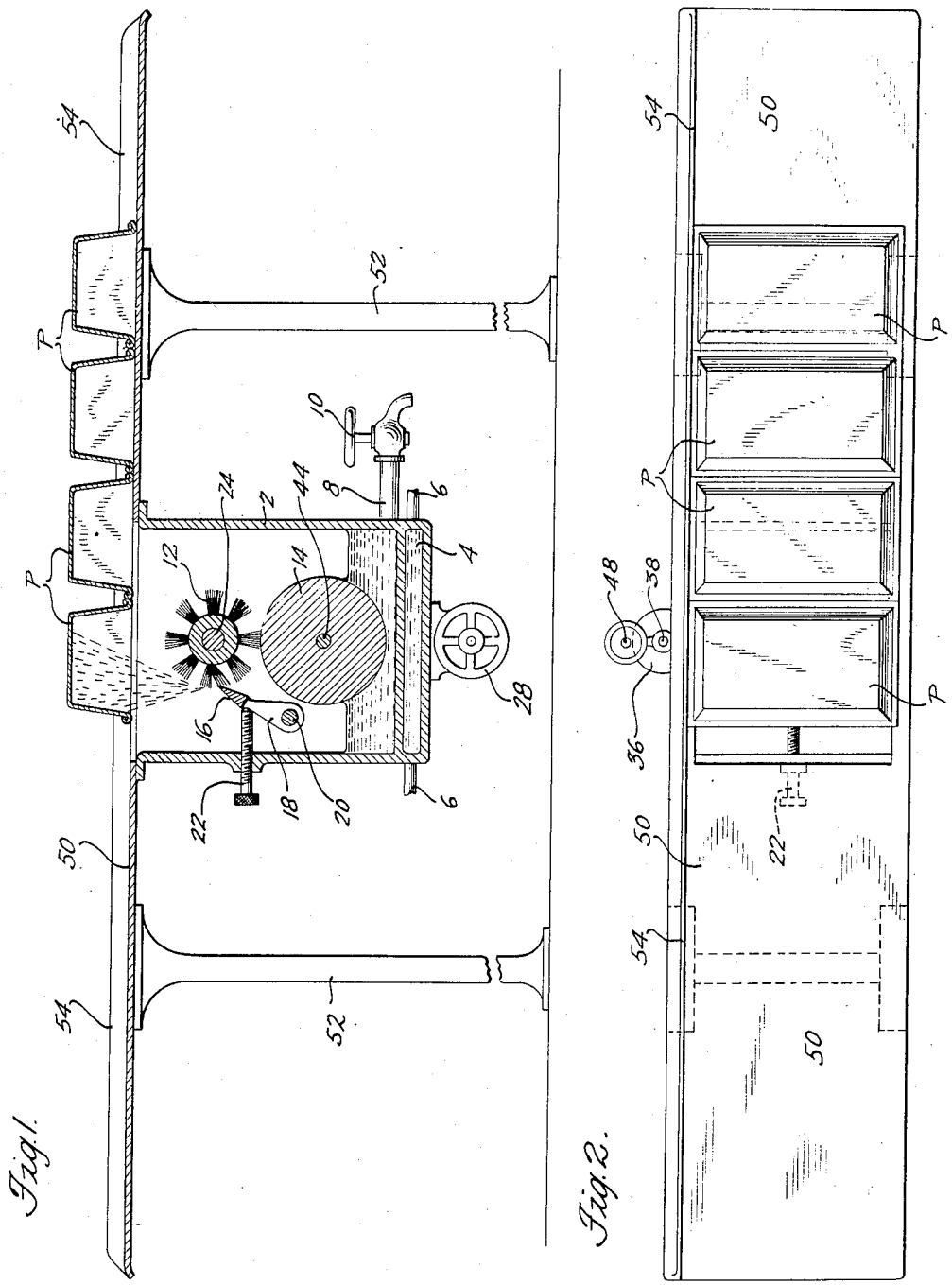

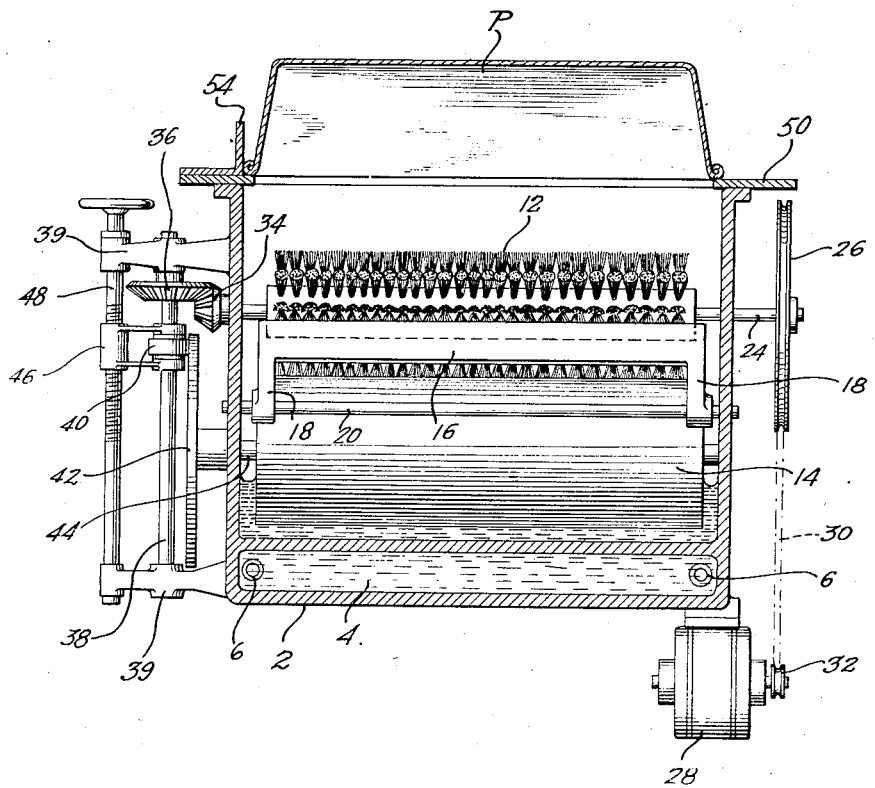

1,686,968

UNITED STATES PATENT OFFICE.

LAURENCE S. HARBER, OF SAGINAW, MICHIGAN, ASSIGNOR, BY MESNE ASSIGNMENTS, TO BAKER PERKINS COMPANY, INC., OF SAGINAW, MICHIGAN, A CORPORATION OF NEW YORK.

PAN-GREASING MACHINE.

Application filed December 22, 1924. Serial No. 757,304.

This invention relates to machines for applying grease to the interiors of baking pans.

As is well known to those skilled in the art, pans in which bread, cake and other materials are to be baked should be thoroughly greased on the interior before the material is placed in the pans, to prevent the material from sticking to the pans after the baking operation is completed. The greasing operation requires considerable time in commercial bakeries and increases considerably the cost of manufacture of the baked product.

The primary object of the present invention is to produce a machine by which baking pans may be greased efficiently and much more rapidly than can be done by hand.

With this and other objects in view the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Fig. 1 is a view in vertical section of a mechanism embodying the invention;

Fig. 2 is a plan view of the mechanism shown in Figure 1; and

Fig. 3 is a view in vertical section of said mechanism taken substantially on the line 3—3 of Figure 1.

In the form of the invention illustrated in the drawings of this application the pan greasing mechanism comprises a container or tank indicated at 2 for holding a supply of grease or oil to be applied to the pans. This container is preferably heated to maintain the grease in suitable condition for application to the pans by means of a steam chamber 4 to which are connected steam pipes 6 of a suitable steam supply system. The grease container 2 is provided with a drain pipe 8 controlled by a valve 10 by means of which the grease may be drained from the grease container when desired.

The grease is delivered from the upper end of the container in the form of a spray by means of a rotary brush indicated at 12. The grease is preferably applied to the brush 12 by means of a roller 14 mounted to rotate within the container and arranged to engage the ends of the tufts of bristles on the brush in the manner illustrated in Figure 1. An amount of grease is introduced into the grease container sufficient to cover the lower portion of the roller 14, the roller being partially immersed in the grease as shown. Thus, as the transfer roller 14 and brush rotate the grease is lifted from the mass in the container and transferred to the brush by the roller in a regulated quantity dependent upon the speed of rotation of the transfer roller.

In order to cause the brush to deliver the grease in a spray from the upper part of the grease tank 2 the brush is arranged to rotate in contact with a bristle deflector indicated at 16. As shown in the drawing this deflector consists of a plate having a relatively sharp edge for engagement with the bristles. As the bristles of the brush are engaged with the deflector 16 they are bent back in the manner shown in Figure 1 and as they are carried past the edge of the deflector they straighten out on account of their resiliency and throw the grease in a spray from the upper portion of the grease container.

In order to enable the action of the deflector plate to be adjusted this plate is mounted so that it may be moved toward and from the axis of the brush. In the construction shown in the drawings the plate 16 is mounted upon arms 18 pivoted at 20 upon the grease container and the position of the plate is controlled by means of an abutment screw 22 threaded into the container and arranged to engage the plate.

The brush 12 is mounted on a shaft 24 to one end of which is secured a pulley 26 and the brush is driven from a motor 28 by means of a belt 30 passing about the pulley 26 and about a pulley 32 mounted on the motor shaft. To the opposite end of the brush shaft is secured a bevel gear 34 meshing with a bevel gear 36 secured to a counter shaft 38 mounted in bearings formed on arms 39 secured to the grease container 2.

The roller 14 on shaft 44 is arranged to be driven from the counter shaft 38 through a variable speed mechanism comprising a friction disk 40 mounted on the counter shaft and engaging a friction disk 42 mounted on the shaft 44 of the roller 14. The friction disk 40 is arranged to be shifted toward and from the axis of the disk 42 by means of a yoke 46 embracing the friction disk 40 and arranged to be adjusted by means of a rod 48, threaded into the yoke and arranged to rotate in suitable bearings in the ends of the arms 39.

The above driving mechanism enables the speed of the transfer roller 14 to be adjusted as desired to regulate the quantity of grease delivered to the spraying brush. The transfer roller may be rotated in either direction by a suitable adjustment of the friction disk 40.

The baking pans to be greased may be brought to the machine and located in position to receive grease from the spraying brush in various ways. In the present construction, the mechanism comprises a guideway along which the pans P may be fed in succession over the grease tank. As shown, the grease tank 2 is secured at its upper end to a table 50 which is mounted on suitable supports 52. The table 50 is provided with an opening at the upper end of the grease tank through which the pans may be sprayed. The table is provided at its rear margin with an upright abutment plate 54 arranged to be engaged by an edge of each of the pans to locate the pans in operating position, as shown in Figure 3. The table 50 and the plate 54 thus constitute a guideway along which the pans may be fed over the grease tank in position to receive grease from the spraying brush, the pans being passed along the guideway successively in inverted positions, as shown in Figure 1. The pans may be fed over the guideway by any suitable automatic feeding mechanism or they may be fed by hand. As the pans pass in succession over the upper end of the grease tank 2, they will each receive a spray of grease from the spraying brush.

The above grease applying mechanism is extremely simple in construction, is reliable in operation and requires a relatively small amount of power for its operation. The construction of this mechanism is such that it will not become clogged with the grease or oil and the grease employed need not be strained before being placed in the grease container.

It is to be understood that the invention is not limited to the particular construction and arrangement of parts of the illustrated embodiment of the invention but that the invention may be embodied in other forms within the scope of the claims.

Having explained the nature and object of the invention and having specifically described a mechanism embodying the invention in its preferred form, what is claimed is:

1. A pan greasing machine having in combination a grease container, a grease spraying brush and a pan guideway positioned above said grease spraying brush along which the pans may be passed over said brush and in positions to receive a spray of grease upon the interiors thereof.

2. A pan greasing machine having in combination a grease container, a rotary brush for spraying grease on the interiors of pans positioned above the brush, a transfer roll rotating in the grease in the container and engaging the bristles of said brush to deliver the grease thereto, and means for projecting grease from said brush upwardly onto said pans.

3. A pan greasing machine having in combination a grease container, a rotary brush for receiving grease from said container, a roll rotating in the grease in the container and engaging said brush to deliver the grease to the bristles thereof, a bristle deflector arranged to engage the bristles to cause the same to produce a spray of grease, and a pan guide for guiding the pans in inverted positions past the brush.

4. A pan greasing machine having in combination a grease container, a spraying brush, a roller rotating in the said grease container and arranged to deliver the grease to the bristles of the said brush, and means for regulating the quantity of grease transferred to the latter by the said roller.

5. A pan greasing machine having in combination a grease container, a spraying brush, a roller rotating in said grease container and arranged to deliver grease to the bristles of the said brush, and means for regulating the speed of the said roller and thereby the quantity of grease transferred by the latter to the said brush.

Signed at Saginaw, Michigan this 16th day of December, 1924.

LAURENCE S. HARBER.